United States Patent

Fortune et al.

Patent Number: 6,012,007
Date of Patent: Jan. 4, 2000

[54] OCCUPANT DETECTION METHOD AND APPARATUS FOR AIR BAG SYSTEM

[75] Inventors: Duane Donald Fortune, Lebanon; Robert John Cashler, Kokomo, both of Ind.

[73] Assignee: Delphi Technologies, Inc., Troy, Mich.

[21] Appl. No.: 08/868,338

[22] Filed: Jun. 3, 1997

Related U.S. Application Data

[63] Continuation-in-part of application No. 08/566,029, Dec. 1, 1995, Pat. No. 5,732,375.
[51] Int. Cl.$^7$ .............................. B60R 21/12; B60R 21/32
[52] U.S. Cl. .............................. 701/45; 701/46; 340/436; 180/271; 180/273; 280/730.1; 280/735; 307/9.1
[58] Field of Search ....................... 701/45, 46; 340/438, 340/436; 180/271, 273; 280/730.1–735; 307/9.1

[56] References Cited

U.S. PATENT DOCUMENTS

| | | | |
|---|---|---|---|
| 5,430,649 | 7/1995 | Cashler et al. | 364/424.05 |
| 5,732,375 | 3/1998 | Cashler | 701/45 |

*Primary Examiner*—William A. Cuchlinski, Jr.
*Assistant Examiner*—Yonel Beaulieu
*Attorney, Agent, or Firm*—Jimmy L. Funke

[57] ABSTRACT

Pressure sensors on the bottom surface of a seat cushion respond to occupant weight. A microprocessor evaluates the sensor outputs according to total force, load rating, long term average, sensor groups and a fuzzy measure to discriminate between large and small occupants and allow air bag deployment for large but not small occupants. Allow and inhibit decisions are filtered avoid sudden response to transient pressure changes on the seat. When a large occupant is positively detected, an allow decision is locked in place as long as total force exceeds a threshold.

27 Claims, 5 Drawing Sheets

OCCUPANT DETECTION METHOD AND APPARATUS FOR AIR BAG SYSTEM

This is a continuation-in-part of U.S. patent application Ser. No. 08/566,029, filed Dec. 1, 1995, now U.S. Pat. No. 5,732,375, issued Mar. 24, 1998, which is also assigned to the assignee of the present invention.

FIELD OF THE INVENTION

This invention relates to an occupant restraint system using an occupant detection device and particularly to an airbag system having seat pressure detectors in the seat.

BACKGROUND OF THE INVENTION

The expanding use of supplemental inflatable restraints (SIRs) or air bags for occupant protection in vehicles increasingly involves equipment for the front outboard passenger seat. The driver side air bag has been deployed whenever an imminent crash is sensed. The position and size of the driver is fairly predictable so that such deployment can advantageously interact with the driver upon a crash. The passenger seat, however, may be occupied by a large or a small occupant including a baby in an infant seat. It can not be assumed that a passenger of any size is at an optimum position (leaning against or near the seat back). In a system designed for effective interaction with a full sized adult, an advantageous interaction with a small person may not be attained. In such cases it is preferred to disable the passenger side airbag when a small person occupies the seat or when the seat is empty.

It has been proposed in U.S. Pat. No. 5,474,327 to Schousek, entitled "VEHICLE OCCUPANT RESTRAINT WITH SEAT PRESSURE SENSOR", and in U.S. Pat. No. 5,732,375, issued Mar. 24, 1998 and assigned to the assignee of this invention, to incorporate pressure sensors in the passenger seat and monitor the response of the sensors by a microprocessor to evaluate the weight and weight distribution, and for inhibiting deployment in certain cases. These disclosures teach the use of sensors on the top surface of the seat, just under the seat cover, and algorithms especially for detecting the presence and orientation of infant seats. Both of these disclosures form a foundation for the present invention and are incorporated herein by reference. It is desirable, however to provide a system which is particularly suited for discriminating between heavy and light occupants and for robust operation under dynamic conditions such as occupant shifting or bouncing due to rough roads.

SUMMARY OF THE INVENTION

It is therefore an object of the invention to discriminate in a SIR system between large and small seat occupants for a determination of whether an airbag deployment should be permitted. Another object in such a system is to maintain reliable operation in spite of dynamic variations in sensed pressures.

A SIR system, as is well known, has an acceleration sensor to detect an impending crash, a microprocessor to process the sensor signal and to decide whether to deploy an air bag, and a deployment unit fired by the microprocessor. An occupant detection system can determine if an occupant or infant seat is positioned in a way to not benefit from deployment, and then signaling the microprocessor whether to allow or inhibit deploying the air bag.

A number of sensors, judicially located in the seat, can garner sufficient load and distribution information to allow determination of the occupant size. Each sensor is a very thin resistive device, having lower resistance as pressure increases. This information is then used to determine whether to inhibit airbag deployment. The sensors are arranged in groups in the seat. A microprocessor is programmed to sample each sensor, determine a total weight parameter by summing the forces, determine the forces on local groups of sensors, and averaging or filtering to provide several different measures of seat occupancy, each of which can be used determine whether to allow deployment.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
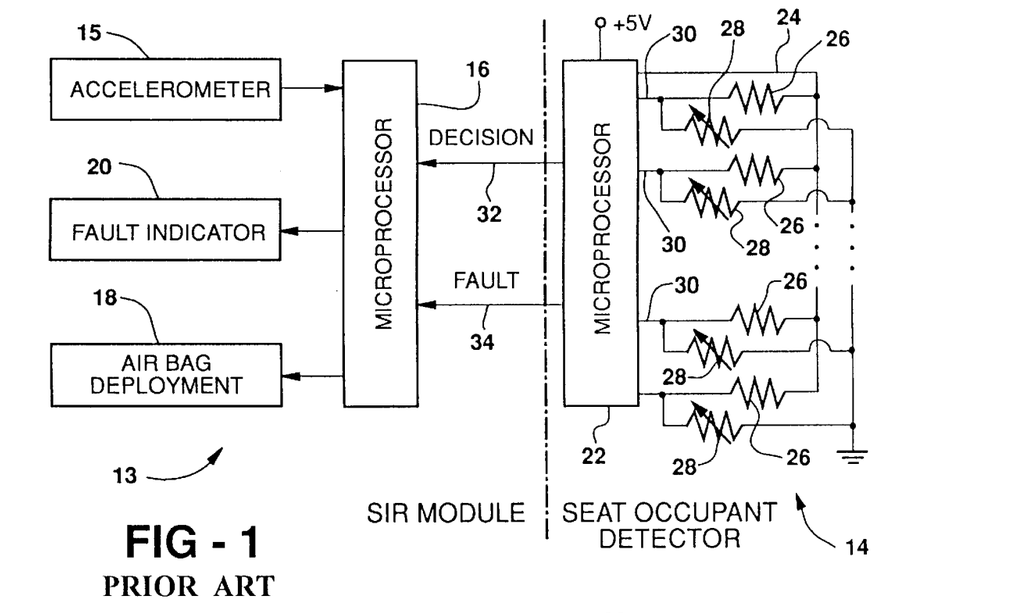
FIG. 1 is a schematic diagram of a prior art SIR system incorporating a seat occupant detector.

Referring to FIG. 1, a SIR system includes a SIR module 13 coupled to a seat occupant sensing system 14. The SIR module 13 includes an accelerometer 15 mounted on the vehicle body for sensing an impending crash, a microprocessor 16 for receiving a signal from the accelerometer and for deciding whether to deploy an air bag. An air bag deployment unit 18 is controlled by the microprocessor 16 and fires a pyrotechnic or compressed gas device to inflate an air bag when a deploy command is received. A fault indicator 20, also controlled by the microprocessor 16 will show a failure of the seat occupant sensing system 14.

It is the aim of the seat sensing system 14 to inhibit air bag deployment when a seat is empty or occupied by a small child, while allowing deployment when the occupant is large. For example, the system may be tuned to always inhibit deployment for occupants weighing less than 66 pounds, and always allow deployment for occupants exceeding 105 pounds. The seat occupant sensing system 14 comprises a microprocessor 22 having a 5 volt supply and an enabling line 24 periodically provided with a 5 volt enabling pulse, and a series of voltage dividers coupled between the enabling line 24 and ground. Each voltage divider has a fixed resistor 26 in series with a pressure sensor or variable resistor 28, and the junction point of each resistor 26 and variable resistor 28 is connected to an A/D port 30 of the microprocessor 22. The microprocessor 22 controls the pulse on enabling line 24 and reads each sensor 28 voltage during the pulse period. The microprocessor 22 analyzes the sensor inputs and issues a decision whether to inhibit air bag deployment and the decision is coupled to the microprocessor 16 by a line 32. The microprocessor 22 also monitors its decisions for consistency and issues a fault signal on line 34 to the microprocessor 16 if faults continue to occur over a long period.

Each fixed resistor 26 is, for example, 10 kohms and the variable resistors vary between 10 kohms at high pressure and 100 kohms at low pressure. Then the voltage applied to the ports 30 will vary with pressure. Each sensor comprises two polyester sheets each having a film of resistive ink connected to a conductive electrode, the two resistive films contacting one another such that the resistance between electrodes decreases as pressure increases. Such pressure sensors are available as ALPS pressure sensors from Alps Electric Co., Ltd., Tokyo, Japan.

Figure 2:
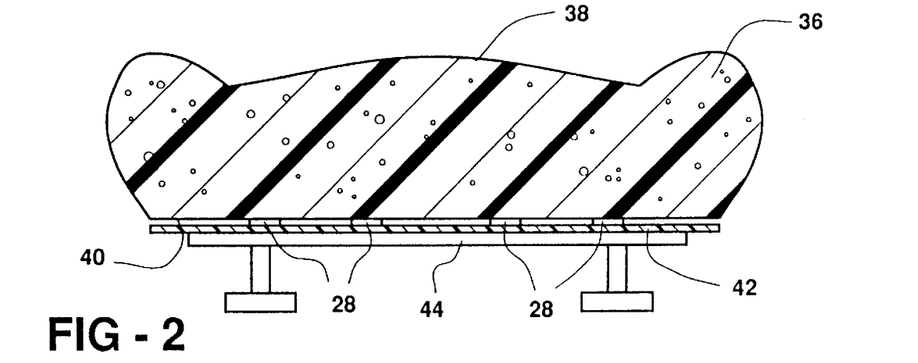
FIG. 2 is a cross section of a seat equipped with pressure sensors, according to the invention.
Figure 3:
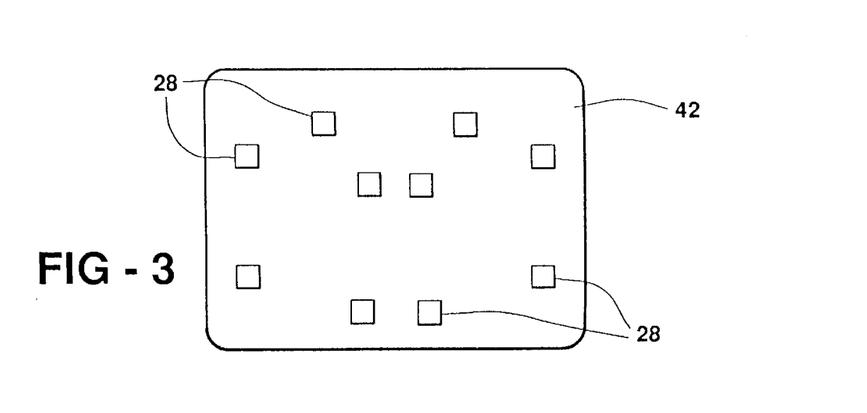
FIG. 3 is a view of a seat support of FIG. 2 equipped with pressure sensors.

FIG. 2 shows a seat cushion 36 having an upper surface 38 for holding an occupant, and a lower surface 40 seated on a rigid sheet or plastic form 42 which in turn is supported by a seat subassembly 44. The form 42, also shown in FIG. 3, holds a dozen pressure sensors 28 on its upper surface so that the sensors are pressed against the bottom surface 40 of the seat cushion 36. Automotive seat cushions assemblies do not normally have the form 42 but here it serves to hold the sensors 28 and to provide a reaction surface for the sensors, allowing each sensor to detect a force imposed by the weight of a seat occupant.

Figure 4:
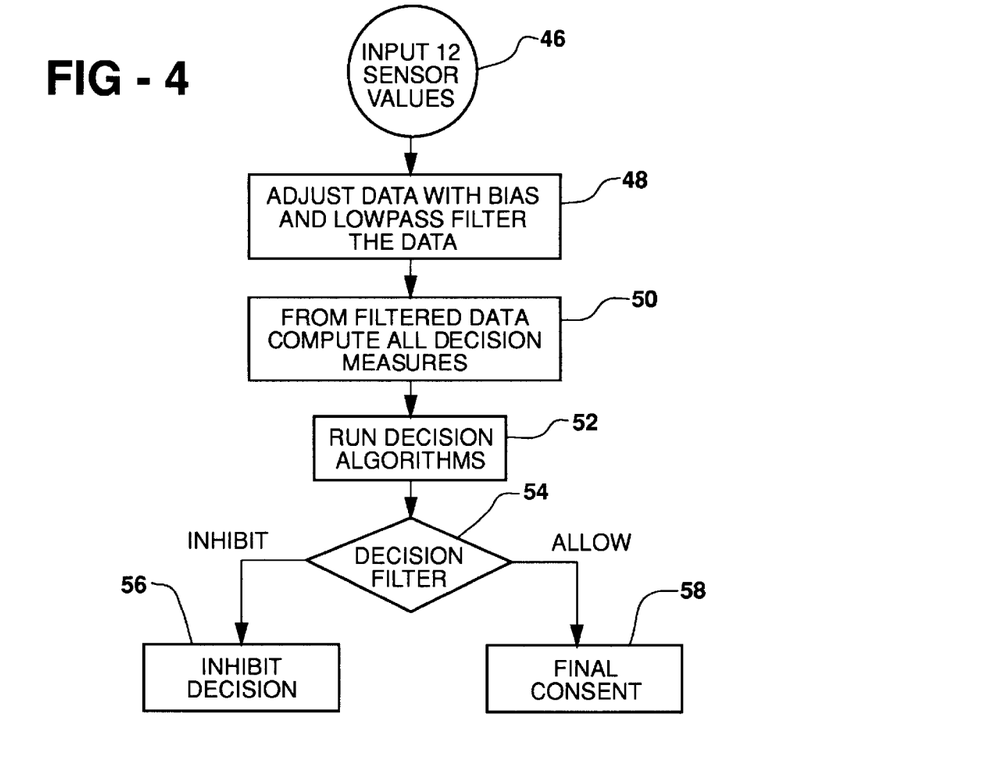
FIG. 4 is flow chart representing an overview of an algorithm for determining deployment consent according to the invention.

The method of operation is illustrated by a series of flowcharts wherein the functional description of each block in the chart is accompanied by a number in angle brackets <nn> which corresponds to the reference number of the block. The overall operation is shown in FIG. 4 wherein the sensor values are read by the microprocessor 22 <46> and the data is adjusted by bias correction and low pass filtering <48>. Once every 100 ms one sensor at a time is turned on and sampled. Then a bias calibrated for each sensor is subtracted from each sensor reading. Then all decision measures are computed <50> and decision algorithms are run <52>. The algorithm output is filtered to avoid the effects of transient events and ultimately a decision is made to allow or inhibit air bag deployment <54>. Then either an inhibit signal is issued <56> or an allow signal is issued <58>. The microprocessor executes the algorithm every 100 ms.

Figure 5:
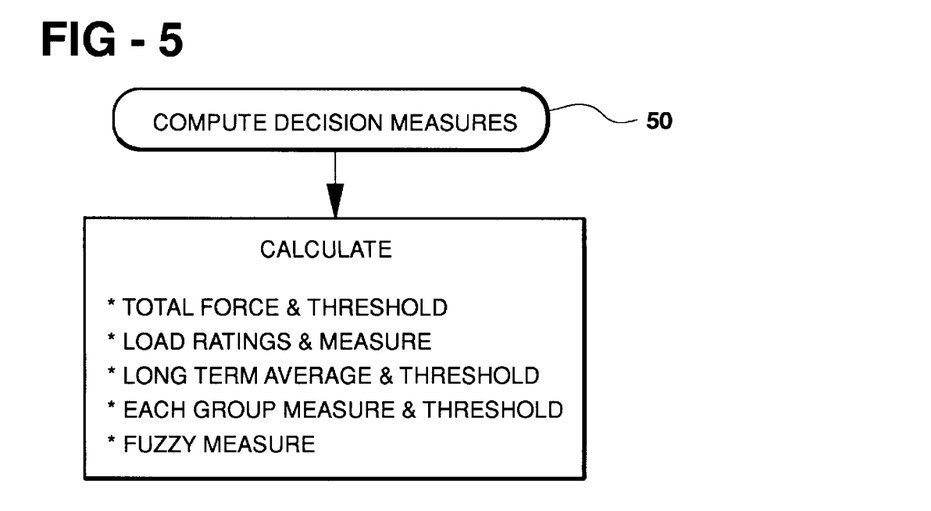
FIG. 5 is a flow chart representing a method of computing decision measures used in the algorithm of FIG. 4.

The computation of decision measures, as shown in FIG. 5, involves calculating total force and its threshold, sensor load ratings and measure, long term average of sensor readings and its threshold, the measure of each sensor group (right, left, etc.) and corresponding threshold, and a fuzzy measure of sensor readings. A fixed threshold is provided for the fuzzy measure and the load rating measure. The other thresholds are variable.

Figure 6:
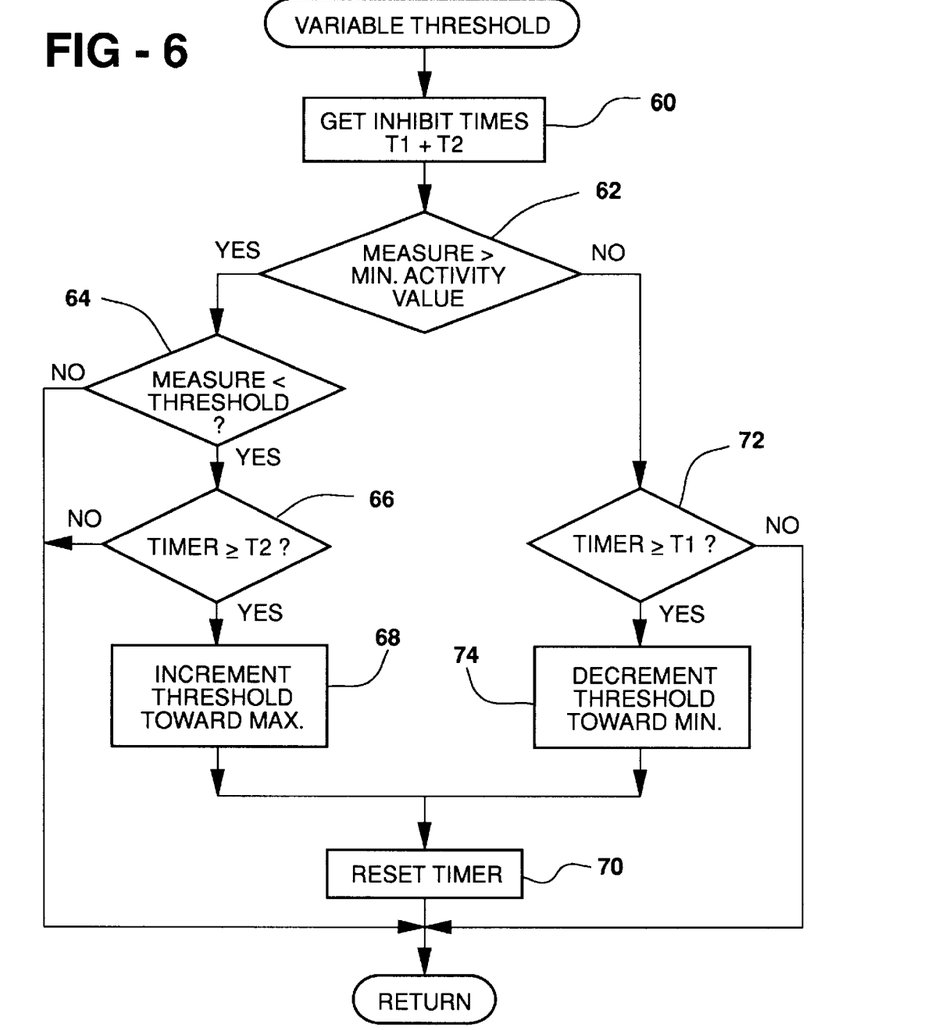
FIG. 6 is a flow chart representing a method of computing variable thresholds according to the invention.

The variable threshold for a measure will slowly increase if the measure is above a selected minimum activity level (chosen for each measure) and will quickly decrease if the measure is below the level. Inhibit times are chosen for each measure to control the rate of increase or decrease; for increase the time T1 is preferably in the range of 30 to 300 seconds, and for decrease the time T2 is preferably less than 1 second. The threshold is allowed to vary between a minimum value and a maximum value. The variable threshold is calculated as shown in FIG. 6. For this and subsequent flowcharts the functional description of each block in the chart is accompanied by a number in angle brackets <nn> which corresponds to the reference number of the block. Inhibit times are selected for each measure. The inhibit times T1 and T2 for the particular measure is retrieved from memory <60>. If the measure is above the minimum activity level <62> and below the variable threshold <64>, and a timer is greater than T2 <66>, the threshold is incremented <68> and the timer is reset <70>. When the measure is less than the minimum activity level <62> and the timer exceeds T1 <72>, the threshold is decremented <74> and the timer reset <70>.

Referring again to FIG. 5, the total force is simply the sum of the sensor outputs. The load ratings are determined in the same way as in the above mentioned application Ser. No. 08/566,029 and as reflected in FIG. 7. There if a measure has a value lower than a it has a zero rating and if it has a value greater than b has a maximum rating, while intermediate values are linearly dependent on the measure. Thus each sensor is given a rating (fuzzy term) depending on its output and reflects the certainty that a load is present. The sum of the ratings gives the load rating measure. The long term average is calculated by 1) averaging all the sensor outputs in each sample period, 2) averaging all of the averages over, say, 16 sample periods, and then 3) long term filtering the result by passing the result through a low pass software filter with a 10 to 20 second time constant. The filter output is the long term average measure. Each group measure is the sum of sensor outputs for various groups of sensors such as a right group, left group, front group, rear group and central group.

Figure 7:
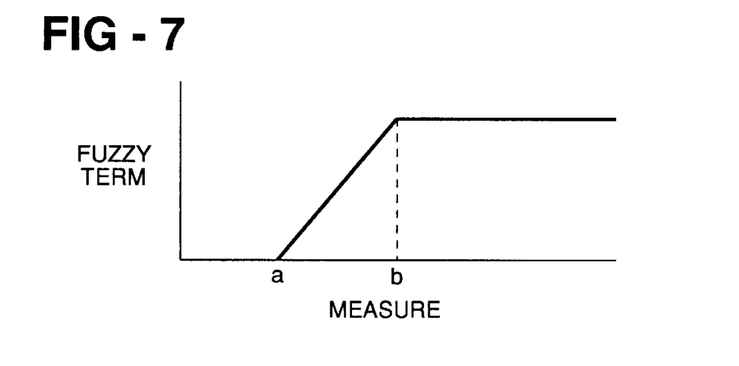
FIG. 7 is a graphical representation of a function used in fuzzy logic for determining load ratings and a fuzzy measure.

The fuzzy measure is calculated by 1) applying the FIG. 7 function to the long term average measure to obtain a long term fuzzy value, 2) applying the FIG. 7 function to the load rating measure to obtain a load rating fuzzy value, and 3) calculating the product of the two fuzzy values.

Figure 8:
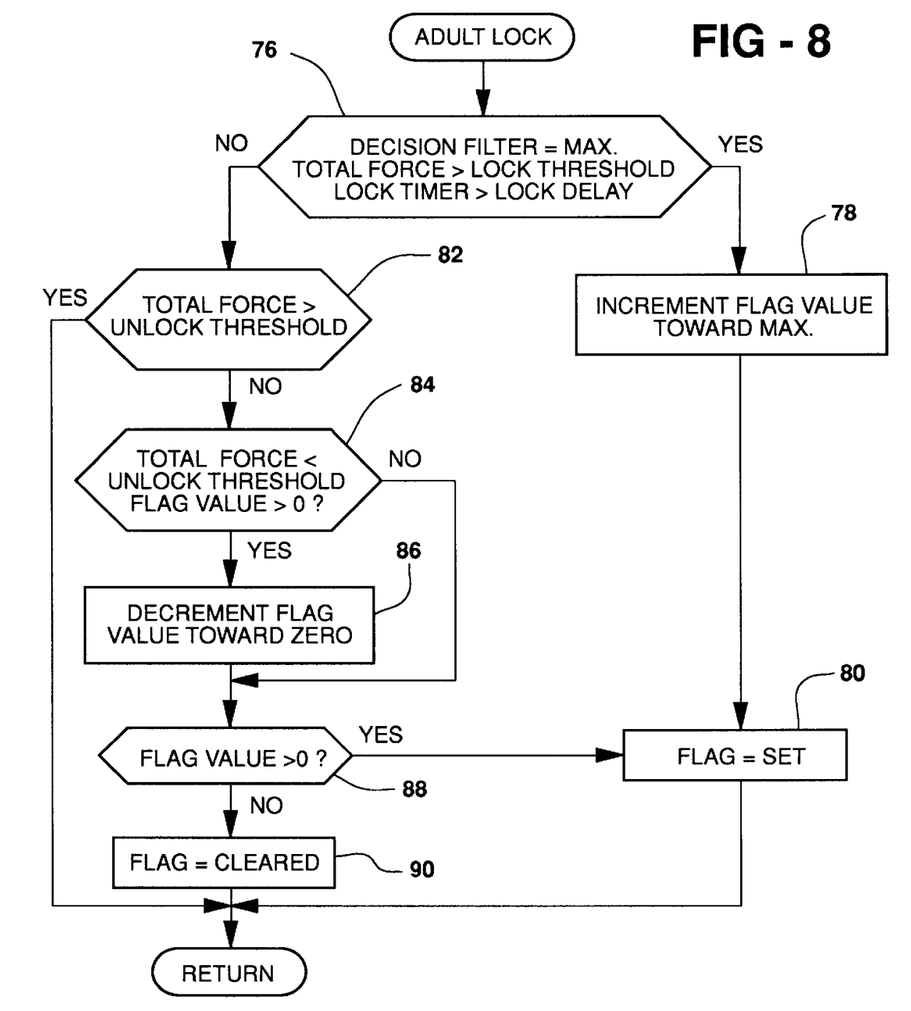
FIG. 8 is a flow chart representing a method of computing an adult lock flag according to the invention.

FIG. 8 is a flowchart for processing an Adult Lock Flag which will be used is the main decision algorithm. The term "Adult" refers not to the age or maturity of an occupant but rather to a weight which is chosen to distinguish from a small child. When the Adult Lock Flag is set, the output decision will always be to allow deployment. The algorithm uses a lock threshold which is above the total force threshold range and an unlock threshold which represents an empty seat. It also uses a lock delay on the order of one to five minutes, and a lock timer which measures the time since vehicle ignition is turned on. If the decision filter 54 is at its maximum value, the total force is greater than the lock threshold, and the lock timer is larger than the lock delay <76>, a flag value is increased toward a maximum value <78> and the Adult Lock Flag is set <80>. If the decision at block 76 is No, it is determined whether the total force is above the unlock threshold <82> and if not, whether the total force is below the unlock threshold and the flag value is greater than zero <84>. If so, the flag value is decremented toward zero <86>, and in either case the flag value is tested <88>; if the value is above zero the Flag is set <80> and if the value is zero the Flag is cleared <90>.

Figure 9:
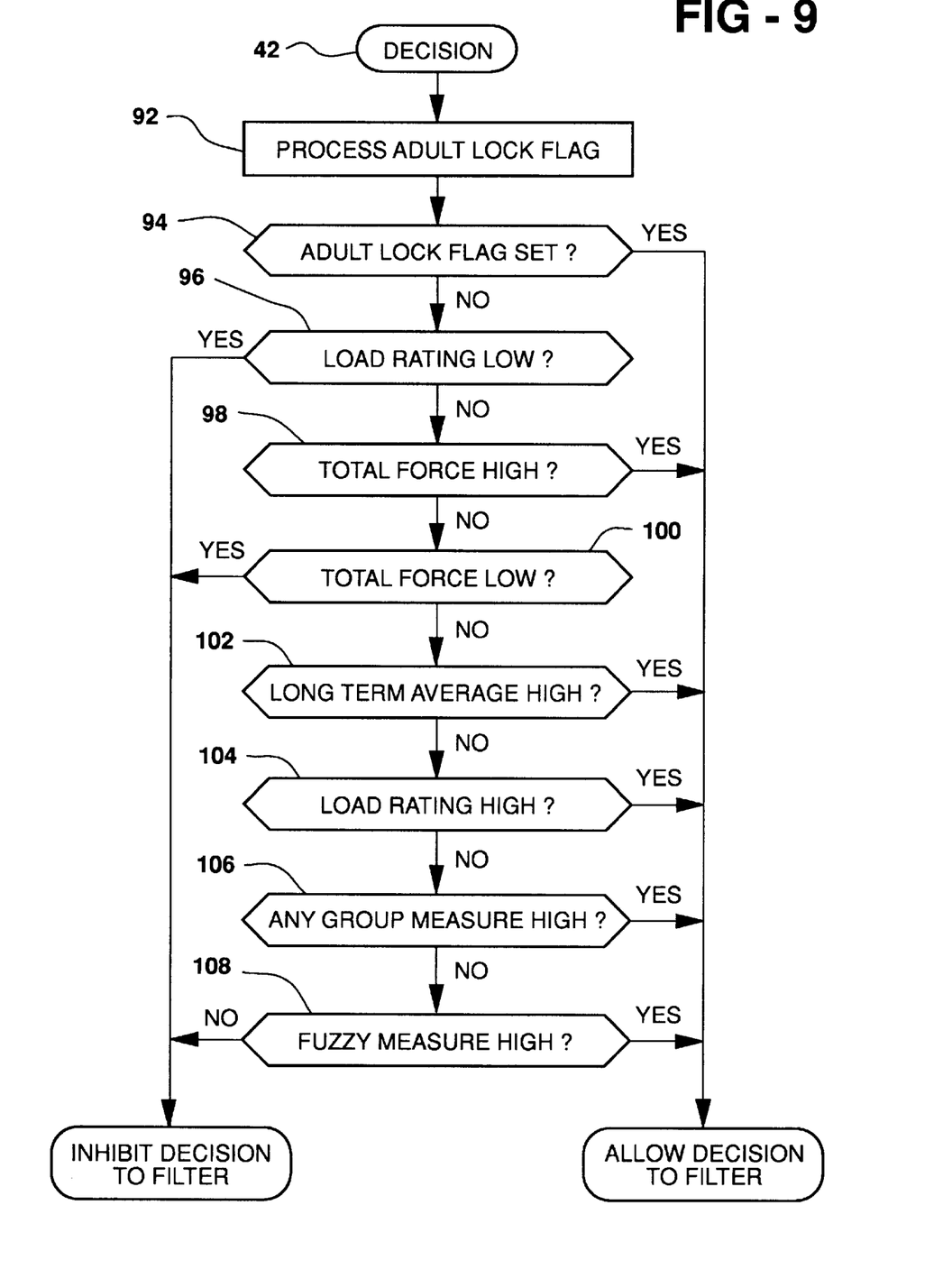
FIG. 9 is a flow chart for deployment decision according to the invention.

The main decision algorithm 42 is shown in FIG. 9. Note that this algorithm will result in an allow or an inhibit decision, but this decision is preliminary, subject to subsequent filtering to obtain a final consent to deployment. Each measure is determined to be high or low by comparison with its variable threshold if one has been computed, or against a fixed threshold. The Adult Lock Flag is processed <92> according to FIG. 8 and if the Flag is set <94> an allow decision is made. If not, and the load rating is low <96> an inhibit decision is made. If the rating is not low the total force is tested <98, 100>. If high, an allow decision is issued and if low an inhibit decision is issued. If neither, it is determined whether the long term average measure <102> the load rating <104>, or a group measure <106> is high, and to issue an allow decision. Finally, if no decision has yet been made, an allow or inhibit decision is made on the basis of the fuzzy measure <108>.

Figure 10:
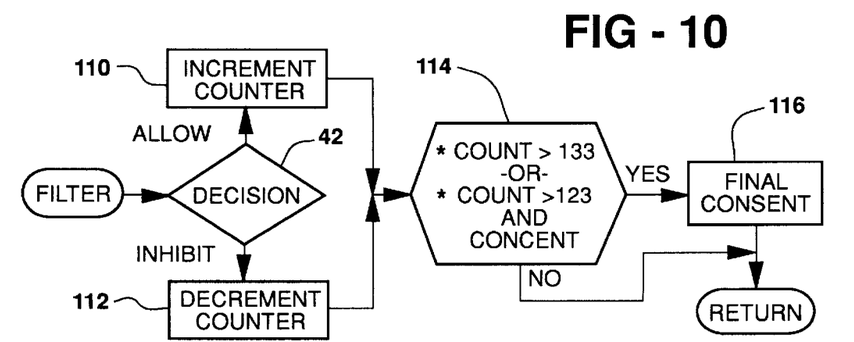
FIG. 10 is a flow chart representing a method of filtering allow and inhibit decisions according to the invention.

The final judgment of whether to consent to deployment is made in the decision filter as shown in FIG. 10. An up and down counter starting at zero and having a maximum count of 255 is used. If an allow decision is made <42> the counter is incremented <110> and if an inhibit decision is made the counter is decremented <112>. When the count exceeds 133 <114> final consent to deployment is granted <116>; if consent is already present, a count over 123 is needed to maintain that state to afford hysteresis. When the count falls below 123 the consent is revoked and deployment will be inhibited. Assuming that the increment size is one count, at the 100 ms loop execution rate a minimum of 13.3 seconds will be required to issue the consent, and at least 25.5 seconds are needed to reach the maximum count needed to set the Adult Lock Flag. Similarly, once the maximum count is attained, at least 13.2 seconds are needed to revoke the consent.

It will thus be seen that process of determining whether an adult size person is occupying the seat is carried out by analyzing sensor output with several measures to insure both that deployment will be allowed with a large occupant and will not occur with a small occupant. Rapid detection of large adults is enabled by the total force and load rating measures, while dynamic sensor outputs caused by frequent occupant movement are managed by the long term average measure. The fuzzy measure helps discriminate between large and small occupants in borderline cases. The seat structure with sensors placed on the bottom surface of the seat cushion permits sensing of occupant weight without great sensitivity to localized forces on the top surface of the seat. Off center weight distributions caused by sitting on a seat edge or leaning in one direction are still detectable.

The embodiments of the invention in which an exclusive property or privilege is claimed are defined as follows:

1. In a vehicle restraint system having a controller for deploying air bags and means for selectively allowing deployment according to the outputs of seat sensors responding to the weight of an occupant, a method of allowing deployment according to sensor response including the steps of:

determining measures represented by individual sensor outputs and calculating from the sensor outputs a relative weight parameter;

establishing a first threshold of the relative weight parameter;

allowing deployment when the relative weight parameter is above the first threshold;

establishing a lock threshold above the first threshold;

setting a lock flag when the relative weight parameter is above the lock threshold and deployment has been allowed for a given time;

establishing an unlock threshold at a level indicative of an empty seat;

clearing the flag when the relative weight parameter is below the unlock threshold for a time; and allowing deployment while the lock flag is set.

2. The method defined in claim 1, including:

establishing a second threshold of the relative weight parameter; and inhibiting deployment when the relative weight parameter is below the second threshold.

3. The method defined in claim 1 wherein the relative weight parameter is the total force detected by all the sensors.

4. The method defined in claim 1 wherein the relative weight parameter is a long term average obtained by the following steps:

averaging all sensor outputs over a plurality of sample events to obtain a cumulative average; and long term filtering the cumulative average to obtain the long term average.

5. The method defined in claim 1 wherein the relative weight parameter is a load rating obtained by:

calculating a load rating for each sensor as a function of the difference between the sensor output and a base value; and summing the load rating for all the sensors to derive a total load rating.

6. The method defined in claim 1 wherein the relative weight parameter is a fuzzy value obtained by:

calculating a total load rating for all the sensors;

determining a fuzzy load value from the total load rating;

calculating a long term average for all the sensors;

determining a fuzzy average value from the long term average; and combining the fuzzy average and the fuzzy load value to obtain the fuzzy value.

7. The method defined in claim 1 wherein the step of setting the lock flag is executed in repetitive loops and comprises:

incrementing a flag value toward a maximum value in each loop when the relative weight parameter is above the lock threshold;

decrementing the flag value toward zero in each loop when the relative weight parameter is less than the unlock threshold; and setting the lock flag when the flag value is greater than zero and clearing the flag when the flag value is zero, so that the flag value at any time determines the minimum time for clearing the flag.

8. The method defined in claim 7 including:

enabling the incrementing step only when a decision filter reaches a maximum count; and the decision filter includes incrementing a counter toward a maximum count in each loop when an allow decision is present, and decrementing the counter when an allow decision is absent.

9. The method defined in claim 1 wherein a step of allowing deployment is a preliminary allow decision and final deployment consent is attained by long term filtering of the allow decision.

10. The method defined in claim 1 wherein a step of allowing deployment is a preliminary allow decision and final deployment consent is attained by the steps of:

beginning at a zero count, periodically incrementing a counter toward a maximum count when an allow decision is present;

periodically decrementing the counter when an allow decision is absent;

establishing an allow threshold; and issuing deployment consent when the counter count exceeds the threshold.

11. The method defined in claim 10 wherein the allow threshold has a first value when deployment consent is absent and a lower value when deployment consent is present to afford hysteresis.

12. The method defined in claim 1 wherein the step of establishing a first threshold includes varying the first threshold over time as a function of the relative weight parameter when the relative weight parameter is below the first threshold.

13. The method defined in claim 1 wherein the step of establishing a first threshold includes varying the first threshold over time within a defined range by the steps of:
   setting a minimum activity level of the relative weight parameter below the defined range;
   increasing the first threshold when the relative weight parameter is above the minimum activity level and below the first threshold;
   decreasing the first threshold when the relative weight parameter is below the minimum activity level.

14. The method defined in claim 13 wherein increasing the first threshold is permitted only after set adjustment times have elapsed since a previous variation.

15. The method defined in claim 13 wherein increasing or decreasing the first threshold is permitted only after set adjustment times have elapsed since the previous adjustment.

16. In a vehicle restraint system having a controller for deploying air bags and means for inhibiting deployment when a seat is not occupied by an adult including seat sensors responding to the weight of an occupant, a method of inhibiting and allowing deployment according to sensor response including the steps of:
   determining forces represented by individual sensor outputs and total force represented by all sensor outputs;
   establishing a first threshold of total force and a second threshold below the first threshold;
   inhibiting deployment when the total force is below a second threshold, and allowing deployment when the total force is above the first threshold;
   establishing a lock threshold above the first threshold;
   setting a lock flag when the total force is above the lock threshold and deployment has been allowed for a given time;
   establishing an unlock threshold at a level indicative of an empty seat;
   clearing the flag when the total force is below the unlock threshold for a time; and
   allowing deployment while the lock flag is set.

17. In a vehicle restraint system having a controller for deploying air bags, means for inhibiting and allowing deployment according to whether a seat is occupied by a person of at least a minimum weight comprising:
   seat sensors responding to the weight of an occupant to produce sensor outputs;
   a microprocessor coupled to the sensor outputs and programmed to inhibit and allow deployment according to sensor response and particularly programmed to
   determine measures represented by individual sensor outputs and calculate from the sensor outputs a relative weight parameter,
   establish a first threshold of the relative weight parameter,
   allow deployment when the relative weight parameter is above the first threshold,
   establish a lock threshold above the first threshold,
   set a lock flag when the relative weight parameter is above the lock threshold and deployment has been allowed for a given time,
   establish an unlock threshold at a level indicative of an empty seat,
   clear the flag when the relative weight parameter is below the unlock threshold for a time, and
   allow deployment while the lock flag is set.

18. Means for inhibiting and allowing deployment as defined in claim 17 wherein:
   the seat comprises a resilient pad having a top surface for bearing an occupant and a bottom surface;
   a support mounting the bottom surface; and
   the seat sensors are arrayed on the bottom surface for sensing forces imposed by the weight of the occupant.

19. Means for inhibiting and allowing deployment as defined in claim 17 wherein:
   the seat comprises a resilient pad having a top surface for bearing an occupant and a bottom surface;
   a support including a panel supporting the bottom surface; and
   the seat sensors are arrayed in an interface defined by the bottom surface and the panel for sensing forces imposed by the weight of the occupant.

20. Means for inhibiting and allowing deployment as defined in claim 17 wherein the microprocessor is further programmed to inhibit deployment when the relative weight parameter is below a second threshold.

21. Means for inhibiting and allowing deployment as defined in claim 17 wherein the relative weight parameter is the total force detected by all the sensors.

22. Means for inhibiting and allowing deployment as defined in claim 17 wherein relative weight parameter is a long term average of sensor outputs and the microprocessor is further programmed to
   average all sensor outputs over a plurality of sample events to obtain a cumulative average, and
   long term filter the cumulative average to obtain the long term average.

23. Means for inhibiting and allowing deployment as defined in claim 17 wherein the relative weight parameter is a total load rating of the sensors and the microprocessor is further programmed to
   calculate a load rating for each sensor as a function of the difference between the sensor output and a base value; and
   sum the load rating for all the sensors to derive a total load rating.

24. Means for inhibiting and allowing deployment as defined in claim 17 wherein to set the lock flag the microprocessor is further programmed to
   periodically increment a flag value toward a maximum value when the relative weight parameter is above the lock threshold,
   periodically decrement the flag value toward zero when the relative weight parameter is less than the unlock threshold, and
   set the lock flag when the flag value is greater than zero and clear the flag when the flag value is zero, so that the flag value at any time determines the minimum time for clearing the flag.

25. Means for inhibiting and allowing deployment as defined in claim 17 wherein a decision to allow deployment is a preliminary decision, and to make a final consent decision the microprocessor is programmed to periodically increment a counter toward a maximum count when an allow decision is present, periodically decrement the counter when an allow decision is absent, establish an allow threshold, and issue final consent when the counter count exceeds the threshold.

26. Means for inhibiting and allowing deployment as defined in claim 17 wherein to establish a threshold the microprocessor is programmed to vary the first threshold over time as a function of the relative weight parameter when the relative weight parameter is below the first threshold.

27. Means for inhibiting and allowing deployment as defined in claim 17 wherein to establish a first threshold which is variable within a defined range the microprocessor is programmed to set a minimum activity level of the relative weight parameter below the defined range, increase the first threshold when the relative weight parameter is above the minimum activity level and below the first threshold, and decrease the first threshold when the relative weight parameter is below the minimum activity level.

\* \* \* \* \*